M. NELSON.
FLOORING SQUARE.
APPLICATION FILED FEB. 24, 1912.
1,035,033.
Patented Aug. 6, 1912.
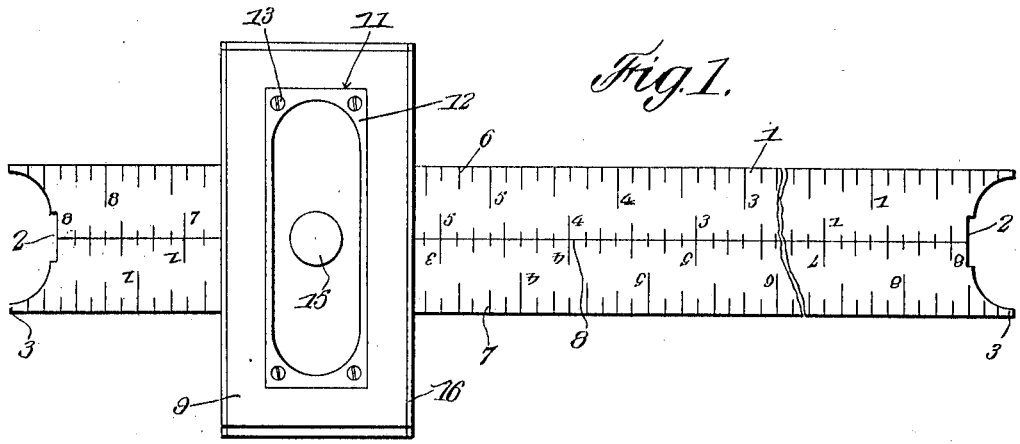
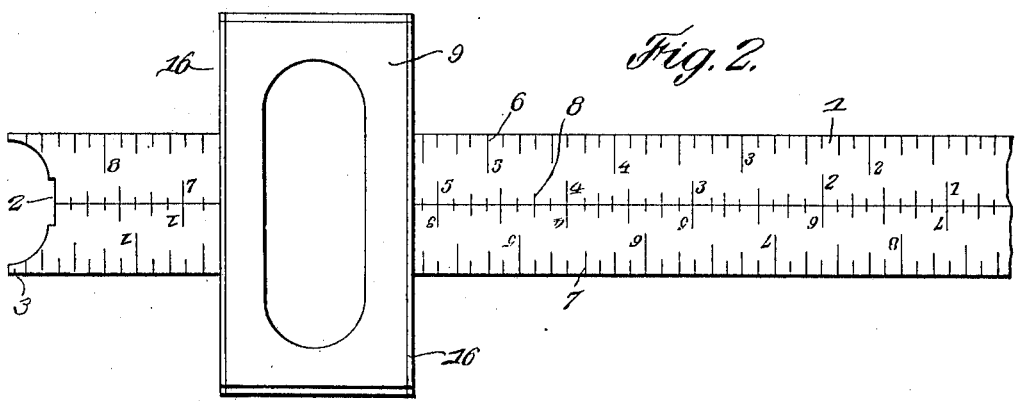
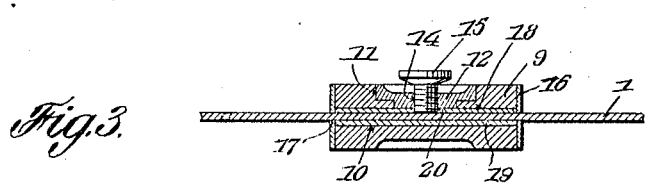
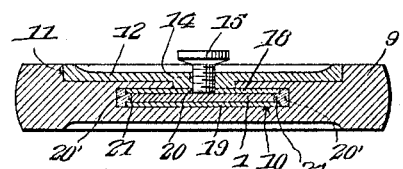
Witnesses
J. H. Crawford
C. C. Hines
Inventor
Magnus Nelson,
By Victor J. Evans
Attorney

UNITED STATES PATENT OFFICE.

MAGNUS NELSON, OF NEW YORK, N. Y.

FLOORING-SQUARE.

1,035,033. Specification of Letters Patent. Patented Aug. 6, 1912.

Application filed February 24, 1912. Serial No. 679,737.

*To all whom it may concern:*

Be it known that I, MAGNUS NELSON, a citizen of the United States, residing at the city of New York, in the borough of Bronx and State of New York, have invented new and useful Improvements in Flooring-Squares, of which the following is a specification.

This invention relates to a square particularly adapted for use in floorlaying, the object of the invention being to provide a simple, convenient and effective device which may be employed for measuring off and obtaining the different lengths and distances from the flooring board to the trim or casing, for obtaining the different angles and squaring off the lines.

A further object of the invention is to provide an instrument of this character which is strong and durable and constructed to enter corners, recesses and other places difficult of access, so that correct measurements at all points may be obtained.

The invention consists of the features of construction, combination and arrangement of parts, hereinafter fully described and claimed, reference being had to the accompanying drawing, in which:—

Figures 1 and 2 are opposite face views of a flooring square embodying my invention. Fig. 3 is a vertical longitudinal section through the square. Fig. 4 is a vertical transverse section thereof.

Referring to the drawing, 1 designates the blade of the square, which is segmentally cut away at each end to provide a central abutting edge 2 and oppositely disposed points 3, which admit of the blade being more firmly arrested against an irregular surface. The cut away portions are also adapted to receive jutting projections on a door casing or the like, whereby the points may be better inserted into recesses on opposite sides thereof in measuring off distance from baseboards, casings, trimmings, etc., inserted in crevices, recesses and other places difficult of access, so that measurements at different points around the surface of a room in which the floor is to be laid may be obtained. Each face of the blade is provided with opposite scales 6 and 7 extending along its side edges, each scale being graduated to inches and fractions thereof, the series of designating ordinals of the scales extending in opposite directions, so that either side edge of either face of the blade may be employed in measuring. Each face of the blade is also provided with a central longitudinal scale 8 extending between the measuring edges 2, which scale is also graduated to inches and fractions thereof and is in the form of a double scale, with rows of ordinals extending in opposite directions. This construction allows measurements to be made along either side edge or the center of either face of the blade, for convenience in measuring distances at different points, the cut out ends of the blade permitting measurements to be made from recesses or jutting projections, as will be readily understood.

A block 9 is slidably mounted on the blade for coöperation therewith in laying off angles and squaring lines. This block may be made of any suitable material and is provided with a transverse slot 10 for the extension of the blade therethrough. One face of the block is provided with a concavity 11 in which is fitted or countersunk a strengthening plate 12 secured thereto by screws 13. This plate is formed with a central screw-threaded opening 14 to receive a set screw 15 which is adapted to engage the blade and clamp the block thereto.

The longitudinal side edges of the block are provided with reinforcing plates 16, formed with slots 17 in alinement with the slot 10, which slots 17 are of somewhat less depth and width than said slot 10. Arranged within the top and bottom of the slot 10 are wear plates 18 and 19, the plate 18 having an opening 20 therein for the passage of the screw 15, so that said screw may bear against the blade 1. Guide strips 20' extend transversely at the ends of the slot 10 and are formed on their inner faces with reduced portions or ribs 21 which extend between and support and hold the plates 18 and 19 in spaced relation, said plates and strips being held from lateral displacement by the reinforcing plates 16.

It will be understood from the foregoing description that the block 9 may be adjusted along the blade 1 and clamped at any point thereto, and that the described mode of constructing the block allows said block to be made of fiber, wood or other suitable material. The plate 12 not only reinforces the body of the block, but supports the clamping screw 15 while the plates 18 and 19 and strips 20 form wear surfaces which ride in contact with and insure a smooth and even fit between the plate and block, ease of movement in sliding the block and a reduction in the amount of wear on the block from the frequent adjustment thereof.

Having thus described the invention, what I claim as new is:—

1. A measuring device comprising a blade cut away at each end to provide a central transverse abutting edge and projecting side indicating points, said blade having marginal scales coöperating with the indicating points and having their designating ordinals extending in opposite directions respectively, and a central scale coöperating with the abutting edges and having designating ordinals extending in both directions, a block adjustable on said blade, and means for clamping said block in position.

2. A measuring instrument comprising a scale blade, a block provided with a transverse slot for passage of the blade, transverse strips at the end portions of said slot provided with inwardly projecting ribs, wear plates supported and spaced by said ribs, a strengthening plate countersunk in one face of the block, a set screw carried thereby and projecting through one of the wear plates for engagement with the blade, and reinforcing plates at the sides of the block having slots registering with the transverse slot thereof and of less dimensions than said transverse slot.

In testimony whereof I affix my signature in presence of two witnesses.

MAGNUS NELSON.

Witnesses:
PAUL EGEBERG,
OSCAR JOHNSON.

Copies of this patent may be obtained for five cents each, by addressing the "Commissioner of Patents, Washington, D. C."